United States Patent [19]

Shoji et al.

[11] Patent Number: 4,688,112
[45] Date of Patent: Aug. 18, 1987

[54] POWER-SAVING DATA TRANSFER APPARATUS WITH A FLEXIBLE MAGNETIC DISK OR THE LIKE

[75] Inventors: Makoto Shoji, Fussa; Hiroshi Tsuyuguchi, Tokyo; Shozo Toma, Kokubunji; Kazuhiro Hiraki, Mitaka; Tsutomu Morita, Musashino, all of Japan

[73] Assignee: Teac Corporation, Tokyo, Japan

[21] Appl. No.: 705,561

[22] Filed: Feb. 26, 1985

[30] Foreign Application Priority Data

Mar. 2, 1984 [JP] Japan .................................. 59-40127

[51] Int. Cl.$^4$ ..................... G11B 15/04; G11B 15/12
[52] U.S. Cl. ......................................... 360/60; 360/61
[58] Field of Search ................... 360/61, 60, 68, 46, 360/137

[56] References Cited

U.S. PATENT DOCUMENTS 4,089,029 5/1978 Castrodale et al. .................. 360/99
4,396,955 8/1983 Kohtani et al. ....................... 360/60
4,445,155 4/1984 Takahashi et al. .................... 360/99

FOREIGN PATENT DOCUMENTS 57-36473 2/1982 Japan .
58-211359 12/1983 Japan .................................. 360/137
59-40127 12/1984 Japan .

Primary Examiner—Vincent P. Canney
Attorney, Agent, or Firm—Woodcock, Washburn, Kurtz, Mackiewicz and Norris

[57] ABSTRACT

A flexible magnetic disk drive is disclosed which has a disk drive motor for imparting rotation to the magnetic disk under the control of a "motor on" signal, and a stepping motor capable of stepwise rotation in response to stepping pulses for transporting a transducer head or heads radially of the magnetic disk for track to track accessing. Connected to the transducer heads for processing data transferred between them and the magnetic disk, a read/write circuit is connected to a supply terminal via a switching transistor. This switching transistor has connected to its base a switch control circuit for holding the switching transistor nonconductive when the disk drive motor is out of rotation and when the stepping motor is in rotation, and for holding the transistor conductive at least during the progress of data transfer between the transducer heads and the magnetic disk. Preferably, the switch control circuit is further adapted to hold the power control switch open from the moment the disk drive motor is set into rotation to the moment the speed of rotation of the disk drive motor builds up to a prescribed percentage of a normal speed at which data transfer is effected between the transducer heads and the record medium.

6 Claims, 7 Drawing Figures

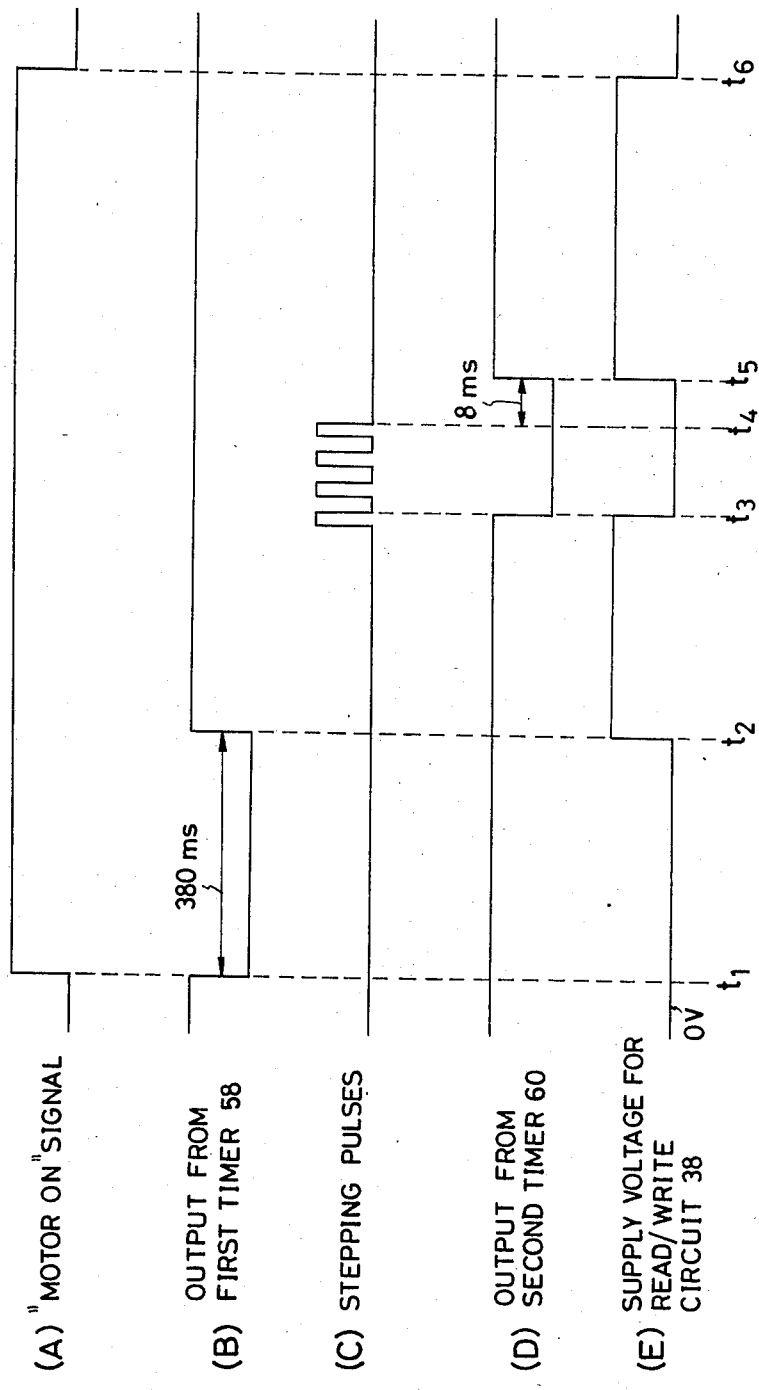

POWER-SAVING DATA TRANSFER APPARATUS WITH A FLEXIBLE MAGNETIC DISK OR THE LIKE

BACKGROUND OF THE INVENTION

Our invention relates to apparatus employing disklike record media for the recording and/or reproduction of data, and more specifically to apparatus for data transfer with flexible magnetic disks now commonly referred to as floppy disks, although we do not wish our invention to be unnecessarily limited to this particular type of record medium. Still more specifically, our invention concerns a device known as a floppy disk drive (FDD) for data transfer to and from interchangeable floppy disks, featuring provisions for avoiding waste of power.

Floppy disks have found widespread acceptance in information processing and allied industries, as well as in offices and homes, as compact data storage media. Being thin and limply flexible, the disks are usually encased in more rigid, apertured envelopes to make up disk cartridges or cassettes that are self supporting. There have also been suggested and used a variety of FDDs for data transfer to and/or from such disk cartridges or cassettes. U.S. Pat. No. 4,089,029, issued May 9, 1978 to Castrodale et al. and assigned to International Business Machines Corp., represents a familiar example of floppy disk and FDD combination, and a different floppy disk and FDD combination has more recently been proposed by Sony Corp., as disclosed in Japanese Laid Open Patent Application No. 57-36473, laid open to pulbic inspection on Feb. 27, 1982, and in corresponding U.S. Pat. No. 4,445,155 issued Apr. 24, 1984.

Usually, FDDs are not self contained; they are slave units under the control of master equipment typically comprising a central processor unit (CPU) and an associated FDD controller. Each FDD intended for use with such master equipment has no power switch of its own. In a data processing system comprising a CPU, an FDD controller, and one or more FDDs, for example, only one power switch serves the complete system.

A problem has existed in the power consumption of such a data processing system. The FDD or FDDs are not necessarily used for data transfer at all times after the closure of the power switch of the complete system. Conventionally, however, power has been fed to and consumed by the various components of the FDD or FDDs even when they are not in actual use. This of course has incurred a substantial waste of energy.

SUMMARY OF THE INVENTION

We object to that waste of energy and hereby propose an improved data transfer apparatus of the kind defined that realizes a remarkable curtailment of power consumption in a simple and thoroughly practicable manner and without in any way sacrificing the normal operation of the apparatus for which it is intended.

Our invention may be broadly summarized as a data transfer apparatus for use with a disklike record medium such as a flexible magnetic disk having data storage tracks thereon, comprising a disk drive motor for imparting rotation to the record medium, a head transport motor for transporting a transducer radially of the record medium to enable the transducer to access the individual data storage tracks on the record medium for data transfer therewith, and a read/write circuit connected to the transducer for processing data transferred between the transducer and the record medium. A power control switch is connected between power supply means and the read/write circuit for the on/off control of power fed from the former to the latter. Provided for actuating the power control switch is a switch control circuit which holds the power control switch open at least when the disk drive motor is out of rotation and when the head transport motor is in rotation, and which holds the power control switch closed at least during the progress of data transfer between the transducer and the record medium.

The read/write circuit functions to process data being written on, or read from, the record medium. Its operation is therefore necessary only during the progress of data transfer. Our invention suggests to automatically disconnect the read/write circuit from the power supply when the disk drive motor, and therefore the record medium, is out of rotation and when the head transport motor is in rotation to transport the transducer from track to track on the record medium, because the read/write circuit need not operate during these periods. We have thus realized a substantial curtailment of power consumption without adversely affecting the operation of the apparatus in any way.

As is well known, in FDDs in general, data transfer is not commenced immediately when the disk drive motor is set into rotation, but only after the rotative speed of the motor has become sufficiently high. Thus, preferably, the switch control circuit is further adapted to hold the power control switch open from the moment the disk drive motor is set into rotation to the moment the speed of rotation of the disk drive motor builds up to a prescribed percentage of the normal speed at which data transfer is effected between the transducer heads and the record medium. With the read/write circuit held disconnected from the power supply during this period, a further reduction of power consumption can be attained.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIG. 3 consisting of (A)–(E) is a waveform diagram useful in explaining the operation of the FDD of FIG. 1.

DESCRIPTION OF THE PREFERRED EMBODIMENT

Figure 1:
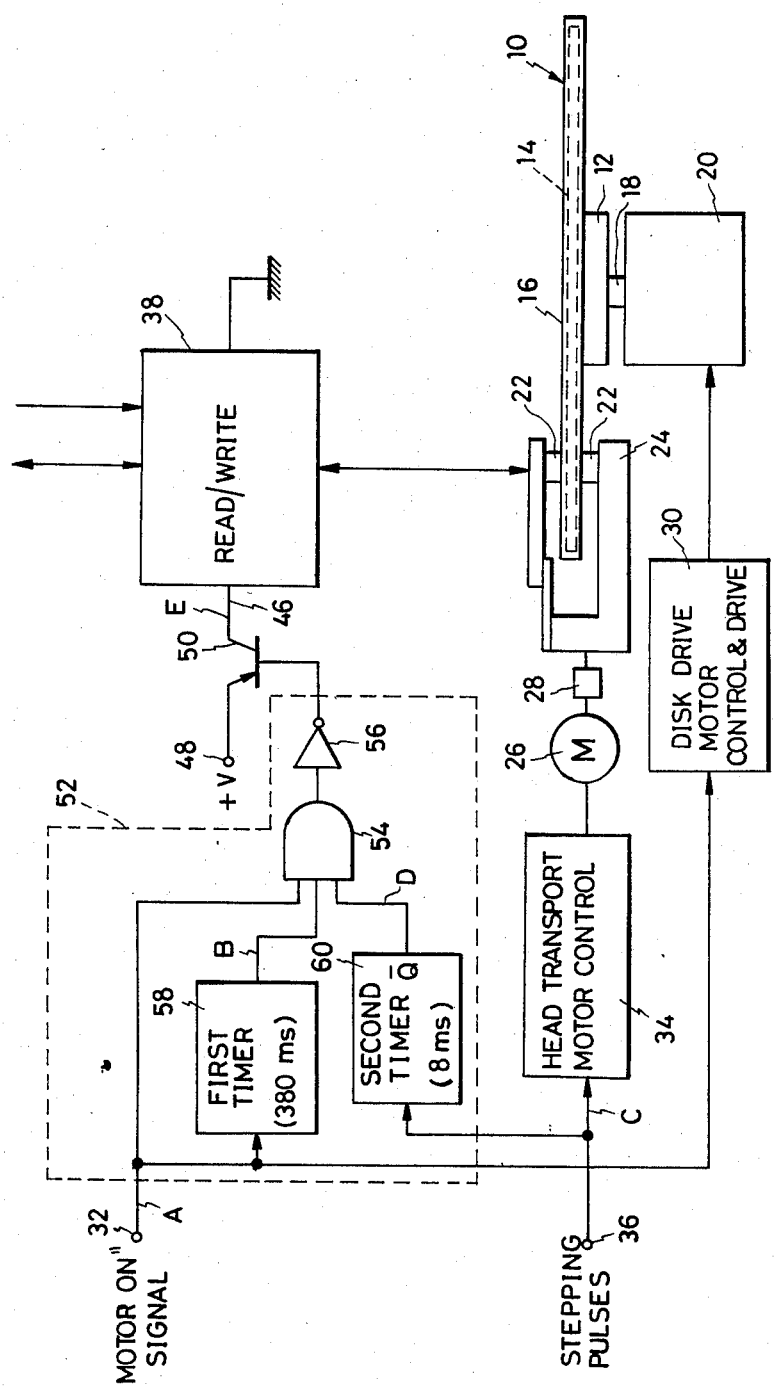
FIG. 1 is a block diagrammatic representation of an FDD constructed in accordance with the novel concepts of our invention, showing only those parts of the FDD which are essential for the disclosure of the inventive concepts, together with a flexible magnetic disk cartridge mounted in place therein.

We will now describe our invention in detail as embodied in an FDD for use with a replaceable flexible magnetic disk cartridge of the kind generally known as a microfloppy disk. Designated 10 in FIG. 1, the disk cartridge is therein shown mounted on a turntable 12. The disk cartridge 10 has a flexible magnetic disk 14 rotatably housed in a generally flat, square envelope 16. Although not specifically illustrated, it is understood that the magnetic disk 14 has a central hub of magnetic material having a center hole and an eccentric slot defined therein. The envelope 16 is apertured to expose this hub and parts of the magnetic disk 14. For further details in the construction of the disk cartridge 10, reference is directed to Kitahara et al. U.S. patent application Ser. No. 676,005 filed Nov. 30, 1984.

The turntable 12 is mounted directly and nonrotatably on an output shaft 18 of a disk drive motor 20. The motor output shaft 18 projects upwardly of the turntable 12 for somewhat loose engagement in the center hole in the hub of the magnetic disk 14. For transmitting the rotation of the turntable 12 to the magnetic disk 14, a drive pin (not shown) is mounted eccentrically on the former for positive engagement in the ecentric slot in the disk hub. The turntable 12 has further mounted thereon a permanent magnet (not shown) for attracting the center hub of the magnetic disk 14.

The particular magnetic disk 14 employed in this embodiment of our invention is assumed to be double sided; that is, both faces of the disk are used for storing data. Thus, in FIG. 1, the magnetic disk 14 is shown caught between a pair of magnetic transducer heads 22 through the unshown apertures in the envelope 16 for data transfer therewith. The pair of transducer heads 22 are both mounted on a carriage 24 thereby to be transported radially of the magnetic disk 14. Employed for driving the carriage 66 is a head transport motor 26 of the electrical stepping type capable of rotation in short and essentially uniform angular movements. The head transport motor 26 is coupled to the carriage 24 via a suitable rotary to linear converter, shown in block form and labeled 28, such as the familiar steel belt bent into the approximate shape of the Greek alpha. The rotary to linear converter 28 translates the bidrectional, stepwise rotation of the head transport motor 26 into the linear back and forth travel of the carriage 24 and therefore of the transducer head 22 thereon from one data storage track to another on the magnetic disk 14. Reference may be had to the aforesaid patent application Ser. No. 676,005 for further details in the construction of the disk drive mechanism and the head transport mechanism.

The disk drive motor 20 is electrically connected to and operated by a control and drive circuit 30. This circuit is connected to a terminal 32 from which there is supplied, as from the master equipment (not shown) controlling the FDD, a "motor on" signal for the on/off control of the disk drive motor 20.

The head transport motor 26 is connected to and controlled by a control circuit 34, which in turn is connected to a terminal 36 from which are supplied stepping pulses for the incremental rotation of the head transport motor. The head transport motor 26 may be a four phase stepping motor, for example, and the control circuit 34 may drive the motor by the single phase mode, as has been known heretofore.

Figure 2:
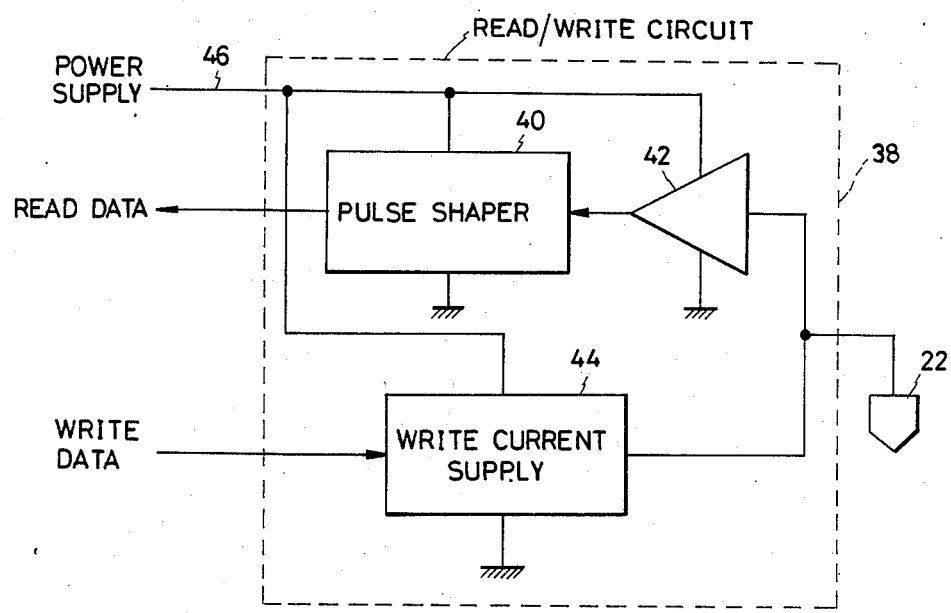
FIG. 2 is a block diagram showing the read/write circuit of the FDD of FIG. 1 in more detail.

At 38 is shown a read/write circuit for processing data to be written on, or read from, the magnetic disk 14. As illustrated in more detail in FIG. 2, the read/write circuit 38 includes a pulse shaper 40 connected to each transducer head 22 via a read amplifier 42. The output waveform of the transducer head 22, representative of data that have been recovered from the magnetic disk 14, is amplified by the read amplifier 42 and is shaped by the pulse shaper 40 into a more discrete pulse form, prior to delivery to the unshown master equipment. Also included in the read/write circuit 38 is a write current supply circuit 44 having its input connected to the master equipment for receiving data to be written. The output of the write current supply circuit 44 is connected to each transducer head 22. The read/write circuit 38 of this general configuration has been known, however, and therein lies no feature of my invention.

The pulse shaper 40, read amplifier 42, and write current supply circuit 44 of the read/write circuit 38 are all connected to a common supply line 46. As will be seen by referring back to FIG. 1, the common supply line 46 leads to a supply terminal 48 via a power control switch herein shown as a switching transistor 50 of the pnp construction, having its emitter connected to the supply terminal and its collector to the read/write circuit 38. I will hereinafter refer to this switching transistor 50 as the power control transistor. The supply terminal 48 becomes electrically connected to the power supply upon closure of the unshown power switch of the data transfer system. Because of the provision of the power control transistor 50, however, the read/write circuit 38 is not powered unless conduction is initiated through the power control transistor 50 by a switch control circuit, generally designated 52, connected to its base.

The switch control circuit 52 includes a three input AND gate 54 having its output connected to the base of the power control transistor 50 via a NOT circuit 56. Connected to the three inputs of the AND gate 54 are: (1) the "motor on" signal supply terminal 32; (2) a first timer circuit 58; and (3) a second timer circuit 60. When all the three inputs are high, so is the output from the AND gate 54. The high output from the AND gate 54 is inverted by the NOT circuit 56, and the resulting output from the latter causes conduction through the power control transistor 50, electrically connecting the supply terminal 48 to the listed components of the read/write circuit 38.

The first timer circuit 58 has its input connected to the "motor on" signal supply terminal 32. When the "motor on" signal goes high, to set the disk drive motor 20 into rotation via the control and drive circuit 30, the first timer circuit 58 puts out a "negative pulse" of a preassigned duration (e.g. 380 milliseconds). The 380 millisecond duration of the output pulse of the first timer circuit 58 corresponds to the period of time from the moment the disk drive motor 20 is set into rotation to the moment the rotative speed of the disk drive motor builds up to a preset percentage of the normal speed at which data transfer is effected between magnetic disk 14 and transducer heads 22. As is well known, in FDDs in general, means are provided for generating a "ready" signal upon lapse of, say, 420 milliseconds from the moment the disk drive motor is set into rotation, if then the rotative speed of the motor is 90 percent or more of the normal speed. The 380 millisecond duration of the output pulse of the first timer circuit 58 in accordance with my invention is shorter than 420 milliseconds, so that the first timer circuit output pulse terminates before the moment the magnetic disk 14 is found ready for data transfer by the unshown means.

The second timer circuit 60 can take the form of a retriggerable monostable multivibrator, having its input connected to the stepping pulse supply terminal 36 and its "Q" output to the AND gate 54. Thus the second timer circuit 60 puts out a "negative pulse" with a duration of, say, eight milliseconds, in response to the trailing edge of each stepping pulse from the terminal 36.

The eight millisecond duration of each output pulse of the second timer circuit 60 is longer than each time spacing between the stepping pulses. Consequently, upon delivery of a consecutive series of stepping pulses to the second timer circuit 60 (and, of course, to the stepping motor control circuit 34), its output remains low throughout the complete period during which the stepping pulses are being received, the second timer circuit being retriggered by each incoming pulse. Retriggered by the last of the series of stepping pulses, moreover, the second timer circuit 60 continues producing a low output for eight milliseconds after the disappearance of the last stepping pulse.

OPERATION

For an easier understanding of the operation of the FDD of FIG. 1, I have plotted at (A) through (E) in FIG. 3 the wave-forms appearing in the various parts of the FIG. 1 circuitry. I have further indicated by the same capitals A through E the lines on which the FIG. 3 waveforms appear.

As the "motor on" signal from the terminal 32 goes high at a moment t1 as at (A) in FIG. 3, the control and drive circuit 30 will respond by setting the disk drive motor 20 into rotation. It takes a certain length of time, however, for the rotative speed of the disk drive motor 20, and therefore of the magnetic disk 14 on the turntable 12, to grow sufficiently high for the commencement of data transfer.

The "motor on" signal is further delivered to the AND gate 54 of the switch control circuit 52, both directly and via the first timer circuit 58. Triggered by the leading edge of the high state of the "motor on" signal, the first timer circuit 58 will put out the "negative pulse" of the 380 millisecond duration as at (B) in FIG. 3. The output from the first timer circuit 58 will become high at a moment t2, when the magnetic disk 12 will be in such a state of rotation as to be nearly ready for the initiation of data transfer. The "motor on" signal has of course been high from moment t1 to moment t2, and so has been the output from the second timer circuit 60, as at (D) in FIG. 3, because no stepping pulses are yet received as at (C) in FIG. 3. Although two of the three inputs to the AND gate 54 have thus been high during this period, the other one (the output from the first timer circuit 58) has been low as at (B) in FIG. 3. Accordingly, the output from the AND gate 54 has been low, so that the power control transistor 50 has been nonconductive, holding the read/write circuit 38 electrically disconnected from the supply terminal 48. The supply voltage of the read/write circuit 38 is thus zero volt, as at (E) in FIG. 3, from moment t1 to moment t2.

The output from the first timer circuit 58 goes high at the moment t2, and so does the output from the AND gate 54, initiating conduction through the power control transistor 50. The positive supply voltage is thus impressed to the read/write circuit 38 as at (E) in FIG. 3.

As will be seen from (C) in FIG. 3, a series of stepping pulses will be to the stepping motor control circuit 34 via the supply terminal 36 after the moment t2 to cause the head transport motor 26 to transport the pair of transducer heads 22 to a required track position on the magnetic disk 14 via the rotary to linear converter 28. The output from the second timer circuit 60 of the switch control circuit 52 goes low at a moment t3, as at (D) in FIG. 3, as then the second timer circuit is triggered by the trailing edge of the first of the series of stepping pulses. Each of the succeeding stepping pulses retrigger the second timer circuit 60, causing its output to remain low. Further, as the last of the series of stepping pulses retriggers the second timer circuit 60 at a moment t4, its output remains low for eight milliseconds thereafter, until a moment t5.

Thus the output from the second timer circuit 60 remains low from moment t3 to moment t5. Even though the other two inputs to the AND gate 54 are low, as at (A) and (B) in FIG. 4, during this period, the low output from the second timer circuit 60 makes the output from the AND gate 54 to go low, with the consequent nonconduction of the power control transistor 50. No supply voltage is therefore applied to the read/write circuit 38 from moment t3 to moment t5, as at (E) in FIG. 3.

Although the series of stepping pulses disappears at the moment t4 preceding the moment t5, the pair of transducer heads 22 does not normally come to rest in the required track position on the magnetic disk 14 at the exact moment t4. For this reason, data transfer between magnetic disk 14 and transducer heads 22 is usually commenced approximately 15 milliseconds after the disappearance of the last stepping pulse at the moment t4. I have taken advantage of this intervening period, during which the read/write circuit 38 need not be powered, by holding the power control transistor 50 nonconductive for the additional eight milliseconds after the moment t4.

All the three inputs to the AND gate 54 are high during the subsequent period of moment t5 to moment t6. The power control transistor 50 is therefore conductive during this period, allowing the application of the supply voltage to the read/write circuit 38 to enable the same to process data to be written on, or read from, the magnetic disk 14. The power control transistor 50 will become nonconductive as the "motor on" signal goes low at the moment t6, as at (A) in FIG. 3, upon completion of data transfer.

The foregoing will have made clear that, in the FDD of FIG. 1 embodying my invention, the power control transistor 50 coacts with the switch control circuit 52 to hold the read/write circuit 38 electrically disconnected from the supply terminal 48 when the disk drive motor 20 is out of rotation (before the moment t1 and after the moment t6), when the disk drive motor is in rotation at less than the predetermined percentage of the normal speed (from moment t1 to moment t2), and when the head transport motor 26 is in rotation (from moment t3 to moment t4 or t5). Despite a substantial saving of power thus achieved, it will be appreciated that the operation of the FDD is in no way adversely affected since the operation of the read/write circuit is unnecessary during all the above periods.

There is an additional advantage accruing from the nondelivery of power to the read/write circuit during the startup period of the disk drive motor 20 and during the rotation of the head transport motor 26. The power supply need not feed the read/write circuit during the flow of starting current to these motors, so that its capacity can be reduced, making possible the provision of less expensive, more compact apparatus.

POSSIBLE MODIFICATIONS

Although I have shown and described my invention in terms of but one embodiment thereof, I recognize that a variety of modifications or changes of the disclosed embodiment may well occur to one skilled in the art without departing from the scope of my invention. The following, then, is a brief list of such possible modifications:

1. The power control transistor 50 may not necessarily be made nonconductive from moment t1 to moment t2 and from moment t4 to moment t5 in FIG. 3.
2. The power control transistor 50 may be held nonconductive from moment t1 to a moment later than the moment t2, that is, until the magnetic disk becomes ready for data transfer; in other words, conduction may be initiated through the power control transistor 50 upon lapse of, say, 420 milliseconds from the moment the disk drive motor is set into rotation, if then its speed of rotation is not less than 90 percent of the normal speed.
3. Instead of the first timer circuit 58 connected to the "motor on" signal supply terminal 32, there could be employed a circuit whose output would go high, as at the moment t2 in FIG. 3, when the actual speed of rotation of the the disk drive motor 20, or of the magnetic disk 14 driven thereby, rose to a predetermined percentage of the normal speed.
4. In addition to the read/write circuit 38, some other constituent circuit or circuits of the data transfer apparatus might be connected to the supply terminal via the power control transistor 50.
5. The second timer circuit 60 might be triggered by the leading edges of stepping pulses.
6. Only one transducer head may of course be provided if the magnetic disk in use is single sided.
7. My invention finds applications with a variety of disklike record media in addition to the flexible magnetic disk cassette disclosed herein.

We claim:

1. A data transfer apparatus for use with a disklike record medium such as a flexible magnetic disk having data storage tracks thereon, the apparatus comprising:
   (a) a disk drive motor for imparting rotation to the record medium;
   (b) a transducer for data transfer with the record medium;
   (c) a head transport motor for transporting the transducer radially of the record medium to enable the transducer to access the individual data storage tracks on the record medium;
   (d) a read/write circuit connected to the transducer for processing data transferred between the transducer and the record medium;
   (e) power supply means;
   (f) a power control switch connected between the power supply means and the read/write circuit for the on/off control of power fed from the former to the latter; and
   (g) a switch control circuit for holding the power control switch open at least when the disk drive motor is out of rotation and when the head transport motor is in rotation, and for holding the power control switch closed at least during the progress of data transfer between the transducer and the record medium, said switch control circuit being further adapted to hold the power control switch open from the moment the disk drive motor is set into rotation to the moment the speed of rotation of the disk drive motor builds up to a prescribed percentage of a normal speed at which data transfer is effected between the transducer and the record medium.

2. A data transfer apparatus for use with a disklike record medium having data storage tracks thereon, the apparatus comprising:
   (a) a disk drive motor for imparting rotation to the record medium under the control of a "motor on" signal;
   (b) a transducer for data transfer with the record medium;
   (c) a head transport motor for transporting the transducer radially of the record medium under the control of a stepping signal to enable the transducer to access the individual data storage tracks on the record medium;
   (d) a read/write circuit connected to the transducer for processing data transferred between the transducer and the record medium;
   (e) power supply means;
   (f) a power control switch connected between the power supply means and the read/write circuit for the on/off control of power fed from the former to the latter; and
   (g) a switch control circuit responsive to the "motor on" signal and the stepping signal for holding the power control switch open at least when the disk drive motor is out of rotation and when the head transport motor is in rotation, and for holding the power control switch closed at least during the progress of data transfer between the transducer and the record medium, said switch control circuit being further adapted to hold the power control switch open from the moment the disk drive motor is set into rotation to the moment the speed of rotation of the disk drive motor builds up to a prescribed percentage of a normal speed at which data transfer is effected between the transducer and the record medium.

3. A data transfer apparatus for use with a disklike record medium having data storage tracks thereon, the apparatus comprising:
   (a) a disk drive motor for imparting rotation to the record medium under the control of a "motor on" signal, the "motor on" signal having a first prescribed state for holding the disk drive motor out of rotation and a second prescribed state for holding the disk drive motor in rotation;
   (b) a transducer for data transfer with the record medium;
   (c) a stepping motor capable of stepwise rotation in response to stepping pulses for transporting the transducer radially of the record medium to cause the transducer to access the individual data storage tracks on the record medium;
   (d) a read/write circuit connected to the transducer for processing data transferred between the transducer and the record medium;
   (e) power supply means;
   (f) a power control switch connected between the power supply means and the read/write circuit for the on/off control of power fed from the former to the latter;
   (g) a first timer circuit responsive to the "motor on" signal for generating, when the "motor on" signal changes from the first to the second prescribed state, a pulse of a constant duration equal to the period of time from the moment the disk drive motor is set into rotation to the moment the speed of rotation of the disk drive motor reaches a predetermined percentage of a normal speed at which data transfer is effected between the transducer and the record medium;

(h) a second timer circuit responsive to the stepping pulses for generating a pulse of a variable duration during the rotation of the stepping motor; and (i) gate means responsive to the "motor on" signal and the output pulses of the first and second timer circuits for holding the power control switch open when the "motor on" signal is in the first prescribed state and when the output pulses of the first and second timer circuits are being generated, and for holding the power control switch closed when the "motor on" signal is in the second prescribed state and, at the same time, when the output pulses of the first and second timer circuits are both not being generated.

4. A data transfer apparatus as set forth in claim 3, wherein the predetermined percentage of the normal speed is less than 90 percent.

5. A data transfer apparatus as set forth in claim 3, wherein the output pulse of the second timer circuit lasts a preassigned length of time after the disappearance of the last of a series of stepping pulses, whereby the power control switch is held open for the preassigned length of time after the stepping motor has been set out of rotation.

6. A data transfer apparatus as set forth in claim 5, wherein the second timer circuit is a retriggerable monostable multivibrator capable of generating a pulse having a duration longer than the spacing between the series of stepping pulses.

* * * * *